(12) United States Patent
Walster et al.

(10) Patent No.: US 6,779,006 B1
(45) Date of Patent: Aug. 17, 2004

(54) PERFORMING DEPENDENT SUBTRACTION ON ARITHMETIC INTERVALS WITHIN A COMPUTER SYSTEM

(75) Inventors: G. William Walster, Cupertino, CA (US); Dmitri Chiriaev, Campbell, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 615 days.

(21) Appl. No.: 09/710,080

(22) Filed: Nov. 9, 2000

(51) Int. Cl.[7] .............................. G06F 15/00; G06F 7/38
(52) U.S. Cl. ...................................... 708/200; 708/490
(58) Field of Search ............................... 708/200, 160, 708/446, 490

(56) References Cited

U.S. PATENT DOCUMENTS 5,600,584 A * 2/1997 Schlafly ...................... 708/551

OTHER PUBLICATIONS

No author, Interval Arithmetic in Forte Fortran Technical White Paper, May 2000, Sun microsystems, pp. 1–44.*
Michael J. Schulte et al., Hardware Design and Arithmetic Algorithms for a Variable–Precision Interval Arithmetic Coprocessor, Jul. 1995, IEEE Computer Arithmetic Proceedings of the 12 Symposium, p. 222–229.*
Claudio et al., Variability Analysis of Electronic Systems Classical & Interval Methods, 1997, IEEE Proceedings Annual Reliability and Maintainability Symposium, p. 188–193.*
Hernandez et al., Interval Arithmetic Backpropagation, 1993, IEEE Proceedings of 1993 International Joint Conference on Neural Networks, p. 375–378.*
Michael et al., A Variable–Precision Interval Arithmetic Processor, 1994, IEEE, p. 248–258.*
Michael et al., A Processor for Staggered Interval Arithmetic, 1995, IEEE, p. 104–112.*
Haas et al., A Frequency Domain Toolbox Using Interval Arithmetic, 1998, UKACC International Conference on CONTROL, p. 1060–1065.*
Christopher et al., Numericaly Stable Fast Recursive Least Squares Algorithms for Adaptive Filtering using Interval Arithmetic, May 1998, Acoustics, Speech, and Signal Processing, p. 1713–1716.*
Majumdar et al., Interval–based Performance Analysis of Computing Systems, Jan. 1995, Modeling Analysis and Simulationof Computer a Telecommunication Systems, p. 345–351.*

* cited by examiner

Primary Examiner—Todd Ingberg
Assistant Examiner—Chat C. Do
(74) Attorney, Agent, or Firm—Park, Vaughan & Fleming LLP

(57) ABSTRACT

A system for performing dependent interval subtraction, wherein a first interval is subtracted from a third interval to produce a resulting interval, given knowledge that the third interval is the sum of the first interval and a second interval. If the left endpoint of the third interval is negative infinity, the left endpoint of the resulting interval becomes negative infinity. Otherwise, the left endpoint of the resulting interval is computed by subtracting a left endpoint of the first interval from a left endpoint of the third interval, rounded down to a nearest floating-point number. Similarly, if the right endpoint of the third interval is positive infinity, the right endpoint of the resulting interval becomes positive infinity. Otherwise, the right endpoint of the resulting interval is computed by subtracting a right endpoint of the first interval from a right endpoint of the third interval, rounded up to a nearest floating-point number.

21 Claims, 5 Drawing Sheets

$$X \equiv [\underline{x}, \bar{x}] \equiv \{x \in \Re | \underline{x} \leq x \leq \bar{x}\}$$

$$Y \equiv [\underline{y}, \bar{y}] \equiv \{y \in \Re | \underline{y} \leq y \leq \bar{y}\}$$

(1) $X + Y = [\downarrow \underline{x} + \underline{y}, \uparrow \bar{x} + \bar{y}]$ (2) $X - Y = [\downarrow \underline{x} - \bar{y}, \uparrow \bar{x} - \underline{y}]$ (3) $X \times Y = [\min(\downarrow \underline{x} \times \underline{y}, \underline{x} \times \bar{y}, \bar{x} \times \underline{y}, \bar{x} \times \bar{y}), \max(\uparrow \underline{x} \times \underline{y}, \underline{x} \times \bar{y}, \bar{x} \times \underline{y}, \bar{x} \times \bar{y})]$ (4) $X / Y = [\min(\downarrow \underline{x}/\underline{y}, \underline{x}/\bar{y}, \bar{x}/\underline{y}, \bar{x}/\bar{y}), \max(\uparrow \underline{x}/\underline{y}, \underline{x}/\bar{y}, \bar{x}/\underline{y}, \bar{x}/\bar{y})], \text{ if } 0 \notin Y$ $X / Y = \Re^*, \text{ if } 0 \in Y$

FIG. 5

US 6,779,006 B1

PERFORMING DEPENDENT SUBTRACTION ON ARITHMETIC INTERVALS WITHIN A COMPUTER SYSTEM

RELATED APPLICATION

The subject matter of this patent application is also related to the subject matter in a co-pending non-provisional application by G. William Walster and Dmitri Chiriaev, filed on the same day as the instant application, entitled, "Method And Apparatus for Compiling Dependent Subtraction Operations on Arithmetic Intervals," having Ser. No. 09/711,095, and filing date Nov. 9, 2000.

BACKGROUND

1. Field of the Invention

The present invention relates to performing arithmetic operations on interval operands within a computer system. More specifically, the present invention relates to a method and an apparatus for achieving a sharp (narrow as possible) interval result when subtracting a first or second interval operand from a third interval operand, given prior knowledge that the third interval operand is the sum of the first and second interval operands.

2. Related Art

Rapid advances in computing technology make it possible to perform trillions of computational operations each second. This tremendous computational speed makes it practical to perform computationally intensive tasks as diverse as predicting the weather and optimizing the design of an aircraft engine. Such computational tasks are typically performed using machine-representable floating-point numbers to approximate values of real numbers. (For example, see the Institute of Electrical and Electronics Engineers (IEEE) standard 754 for binary floating-point numbers.)

In spite of their limitations, floating-point numbers are generally used to perform most computational tasks.

One limitation is that machine-representable floating-point numbers have a fixed-size word length, which limits their accuracy. Note that a floating-point number is typically encoded using a 32, 64 or 128-bit binary number, which means that there are only $2^{32}$, $2^{64}$ or $2^{128}$ possible symbols that can be used to specify a floating-point number. Hence, most real number values can only be approximated with a corresponding floating-point number. This creates estimation errors that can be magnified through even a few computations, thereby adversely affecting the accuracy of a computation.

A related limitation is that floating-point numbers contain no information about their accuracy. Most measured data values include some amount of error that arises from the measurement process used to create the data values. This error can often be quantified as an accuracy parameter, which can subsequently be used to determine the accuracy of a computation. However, floating-point numbers are not designed to keep track of accuracy information, whether from input data measurement errors or machine rounding errors. Hence, it is not possible to determine the accuracy of a computation by merely examining a floating-point number that results from the computation.

Interval arithmetic has been developed to solve the above-described problems. Interval arithmetic represents numbers as intervals specified by a first (left) endpoint and a second (right) endpoint. For example, the interval [a, b], where $a \leq b$, is a closed, bounded subset of the real numbers, R, which includes a and b as well as all real numbers between a and b. Arithmetic operations on interval operands (interval arithmetic) are defined so that interval results always contain the entire set of possible values. The result is a mathematical system that rigorously bounds numerical errors from all sources, including measurement data errors, machine rounding errors and their interactions.

Note that the first endpoint normally contains the "infimum", which is the largest number that is less than or equal to each of a given set of real numbers. Similarly, the second endpoint normally contains the "supremum", which is the smallest number that is greater than or equal to each of the given set of real numbers. One aspect of the present invention is directed to swapping the infimum and the supremum between the first endpoint and the second endpoint for representational purposes. Note that the infimum of an interval X can be represented as inf(X), and the supremum can be represented as sup(X).

Computer systems are presently not designed to efficiently handle intervals and interval computations. Consequently, performing interval operations on a typical computer system can be hundreds of times slower than performing conventional floating-point operations.

What is needed is a method and an apparatus that facilitates both efficient arithmetic operations on interval operands and interval results that are as narrow as possible. (Interval results that are as narrow as possible are said to be "sharp".)

In order to achieve sharp results, it is possible use knowledge of how operands were previously computed to narrow a resulting interval. For example, if we know that an interval X=A+B, the result of the interval subtraction operation R=X−A can be narrowed to be [inf(X)-inf(A), sup(X)-sup(A)] instead of [inf(X)-sup(A), sup(A)-inf(A)]. Such a subtraction operation is known as a "dependent subtraction operation" because X and A are mathematically dependent as a consequence of the fact that X=A+B.

Because interval addition commutes, there is no need to distinguish between X=A+B and X=B+A. Similarly, there is no need to explicitly describe a dependent addition operation following an interval subtraction.

Although researchers have theoretically shown that dependent interval operations can be used to narrow resulting intervals, existing mechanisms to perform dependent interval operations have a number of shortcomings. They do not handle exception and non-exception conditions that arise in practical applications, such as dealing with infinite or empty intervals. Any invalid inputs that violate the dependence condition are termed exceptions.

What is needed is a method and an apparatus for performing dependent interval operations that efficiently handle exception conditions and invalid inputs.

SUMMARY

One embodiment of the present invention provides a system for performing a dependent interval subtraction operation, wherein a first interval is subtracted from a third interval to produce a resulting interval, given knowledge that the third interval is the sum of the first interval and a second interval. If the left endpoint of the third interval is negative infinity, the left endpoint of the resulting interval is assigned to be negative infinity. Otherwise, the left endpoint of the resulting interval is computed by subtracting a left endpoint of the first interval from a left endpoint of the third interval using a floating-point arithmetic unit, and rounding down to a nearest smaller floating-point number. Similarly, if the right endpoint of the third interval is positive infinity, the right endpoint of the resulting interval is assigned to be positive infinity. Otherwise, the right endpoint of the resulting interval is computed by subtracting a right endpoint of the first interval from a right endpoint of the third interval using the floating-point arithmetic unit, and rounding up to a nearest larger floating-point number.

In one embodiment of the present invention, if both the first interval and the third interval are empty, computing the left endpoint of the resulting interval involves assigning the left endpoint of the resulting interval to be negative infinity, and computing the right endpoint of the resulting interval involves assigning the right endpoint of the resulting interval to be positive infinity.

In one embodiment of the present invention, if the first interval is not empty and the third interval is empty, the resulting interval is set to be empty.

In one embodiment of the present invention, if the first interval is empty and the third interval is not empty, a first exception case occurs. In this case, computing the left endpoint of the resulting interval involves assigning the left endpoint of the resulting interval to be negative infinity, and computing the right endpoint of the resulting interval involves assigning the right endpoint of the resulting interval to be positive infinity.

In one embodiment of the present invention, if the left endpoint of the first interval is negative infinity and the left endpoint of the third interval is not negative infinity, a second exception case occurs. In this case, computing the left endpoint of the resulting interval involves assigning the left endpoint of the resulting interval to be negative infinity, and computing the right endpoint of the resulting interval involves assigning the right endpoint of the resulting interval to be positive infinity.

In one embodiment of the present invention, if the right endpoint of the first interval is positive infinity and the right endpoint of the third interval is not positive infinity, a third exception case occurs. In this case, computing the left endpoint of the resulting interval involves assigning the left endpoint of the resulting interval to be negative infinity, and computing the right endpoint of the resulting interval involves assigning the right endpoint of the resulting interval to be positive infinity.

In one embodiment of the present invention, if the width of the third interval is less than the width of the first interval, a fourth exception case occurs. In this case, computing the left endpoint of the resulting interval involves assigning the left endpoint of the resulting interval to be negative infinity, and computing the right endpoint of the resulting interval involves assigning the right endpoint of the resulting interval to be positive infinity.

One embodiment of the present invention provides a system for compiling computer code to perform a subtraction operation between a first interval and a third interval to produce a resulting interval. The system operates by receiving source code within a compiler. The system next determines if a subtraction operation within the source code is a dependent subtraction operation, wherein the third interval is the sum of the first interval and a second interval. If so, the system produces executable code for the subtraction operation that computes a left endpoint for the resulting interval and a right endpoint for the resulting interval. If the left endpoint of the third interval is negative infinity, the left endpoint of the resulting interval is assigned to be negative infinity. Otherwise, the left endpoint of the resulting interval is computed by subtracting a left endpoint of the first interval from a left endpoint of the third interval using a floating-point arithmetic unit, and rounding down to a nearest smaller floating-point number. Similarly, if the right endpoint of the third interval is positive infinity, the right endpoint of the resulting interval is assigned to be positive infinity. Otherwise, the right endpoint of the resulting interval is computed by subtracting a right endpoint of the first interval from a right endpoint of the third interval using the floating-point arithmetic unit, and rounding up to a nearest larger floating-point number.

BRIEF DESCRIPTION OF THE FIGURES

FIG. 5 illustrates four different interval operations in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
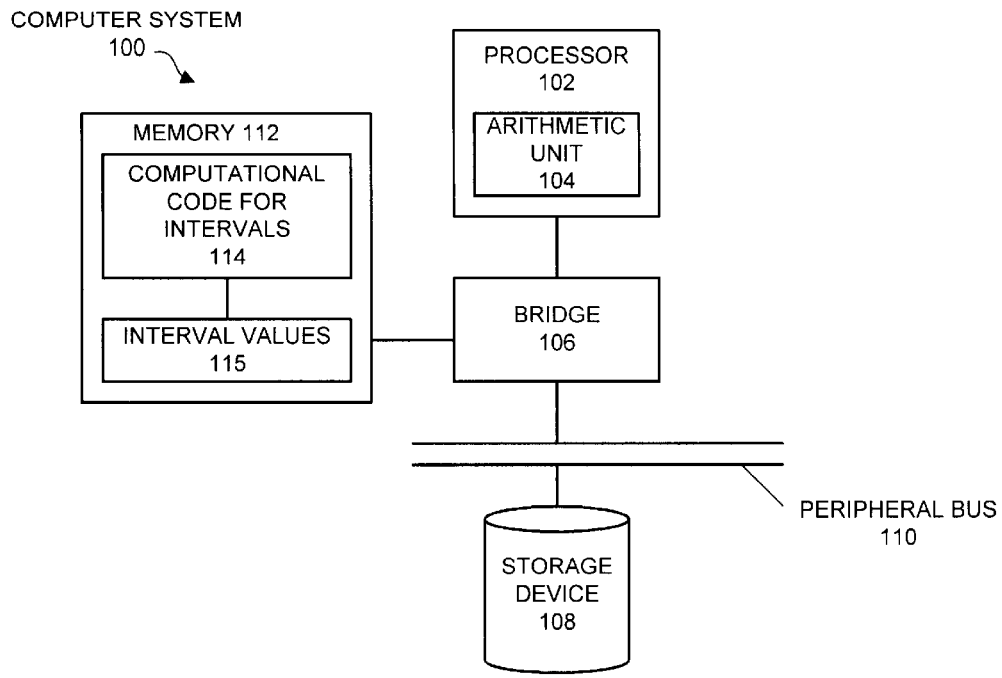
FIG. 1 illustrates a computer system in accordance with an embodiment of the present invention.

FIG. 1 illustrates a computer system 100 in accordance with an embodiment of the present invention. As illustrated in FIG. 1, computer system 100 includes processor 102, which is coupled to a memory 112 and a peripheral bus 110 through bridge 106. Bridge 106 can generally include any type of circuitry for coupling components of computer system 100 together.

Processor 102 can include any type of processor, including, but not limited to, a microprocessor, a mainframe computer, a digital signal processor, a personal organizer, a device controller and a computational engine within an appliance. Processor 102 includes an arithmetic unit 104, which is capable of performing computational operations using floating-point numbers.

Processor 102 communicates with storage device 108 through bridge 106 and peripheral bus 110. Storage device 108 can include any type of non-volatile storage device that can be coupled to a computer system. This includes, but is not limited to, magnetic, optical, and magneto-optical storage devices, as well as storage devices based on flash memory and/or battery-backed up memory.

Processor 102 communicates with memory 112 through bridge 106. Memory 112 can include any type of memory that can store code and data for execution by processor 102. As illustrated in FIG. 1, memory 112 contains computational code for intervals 114. Computational code 114 contains instructions for the interval operations to be performed on individual operands, or interval values 115, which are also stored within memory 112. This computational code 114 and these interval values 115 are described in more detail below with reference to FIGS. 2–5.

Note that although the present invention is described in the context of computer system 100 illustrated in FIG. 1, the present invention can generally operate on any type of computing device that can perform computations involving floating-point numbers. Hence, the present invention is not limited to the computer system 100 illustrated in FIG. 1.

Compiling and Using Interval Code

Figure 2:
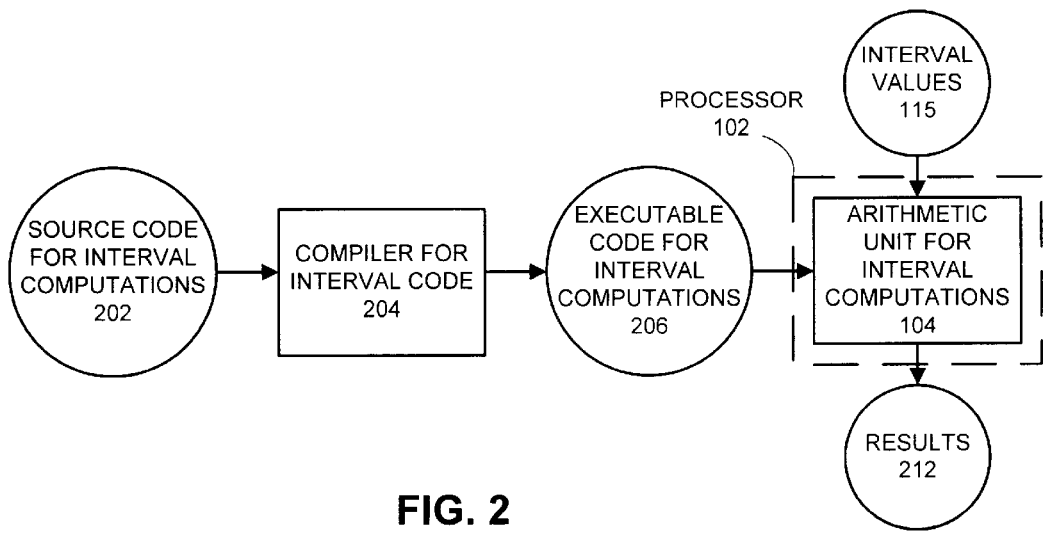
FIG. 2 illustrates the process of compiling and using code for interval computations in accordance with an embodiment of the present invention.

FIG. 2 illustrates the process of compiling and using code for interval computations in accordance with an embodiment of the present invention. The system starts with source code 202, which specifies a number of computational operations involving intervals. Source code 202 passes through compiler 204, which converts source code 202 into executable code form 206 for interval computations. Processor 102 retrieves executable code 206 and uses it to control the operation of arithmetic unit 104.

Processor 102 also retrieves interval values 115 from memory 112 and passes these interval values 115 through arithmetic unit 104 to produce results 212. Results 212 can also include interval values.

Note that the term "compilation" as used in this specification is to be construed broadly to include pre-compilation and just-in-time compilation, as well as use of an interpreter that interprets instructions at run-time. Hence, the term "compiler" as used in the specification and the claims refers to pre-compilers, just-in-time compilers and interpreters.

Arithmetic Unit for Intervals

Figure 3:
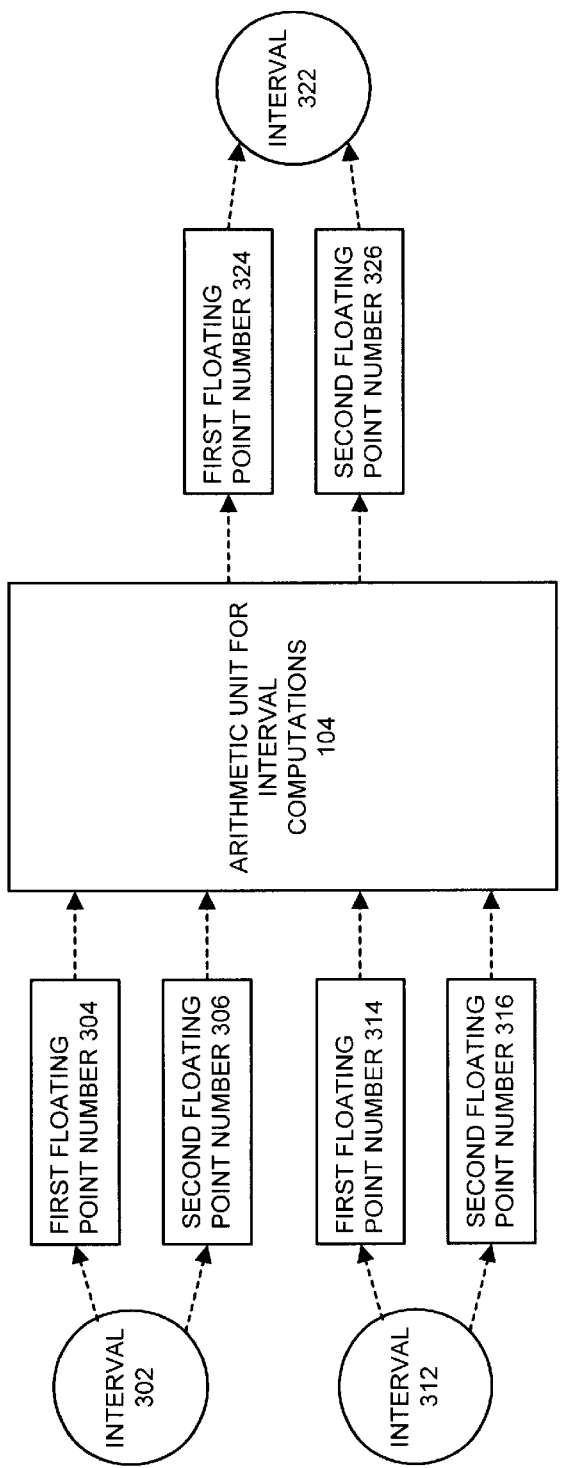
FIG. 3 illustrates an arithmetic unit for interval computations in accordance with an embodiment of the present invention.

FIG. 3 illustrates arithmetic unit 104 for interval computations in more detail accordance with an embodiment of the present invention. Details regarding the construction of such an arithmetic unit are well known in the art. For example, see U.S. patent applications Ser. No. 5,687,106 and 6,044,454, which are hereby incorporated by reference in order to provide details on the construction of such an arithmetic unit. Arithmetic unit 104 receives intervals 302 and 312 as inputs and produces interval 322 as an output.

In the embodiment illustrated in FIG. 3, interval 302 includes a first floating-point number 304 representing a first endpoint of interval 302, and a second floating-point number 306 representing a second endpoint of interval 302. Similarly, interval 312 includes a first floating-point number 314 representing a first endpoint of interval 312, and a second floating-point number 316 representing a second endpoint of interval 312. Also, the resulting interval 322 includes a first floating-point number 324 representing a first endpoint of interval 322, and a second floating-point number 326 representing a second endpoint of interval 322.

Note that arithmetic unit 104 includes circuitry for performing the interval operations that are outlined in FIG. 5. This circuitry enables the interval operations to be performed efficiently.

However, note that the present invention can also be applied to computing devices that do not include special-purpose hardware for performing interval operations. In such computing devices, compiler 204 converts interval operations into a executable code that can be executed using standard computational hardware that is not specially designed for interval operations.

Figure 4:
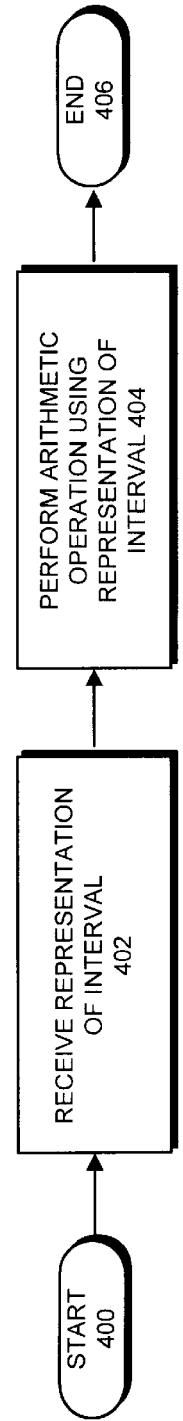
FIG. 4 is a flow chart illustrating the process of performing an interval computation in accordance with an embodiment of the present invention.

FIG. 4 is a flow chart illustrating the process of performing an interval computation in accordance with an embodiment of the present invention. The system starts by receiving a representation of an interval, such as first floating-point number 304 and second floating-point number 306 (step 402). Next, the system performs an arithmetic operation using the representation of the interval to produce a result (step 404). The possibilities for this arithmetic operation are described in more detail below with reference to FIG. 5.

Interval Operations

FIG. 5 illustrates four different interval operations in accordance with an embodiment of the present invention. These interval operations operate on the intervals X and Y. The interval X includes two endpoints, $\underline{x}$ denotes the lower bound of X, and $\overline{x}$ denotes the upper bound of X.

The interval X is a closed, bounded subset of the real numbers R (see line 1 of FIG. 5). Similarly the interval Y also has two endpoints and is a closed, bounded subset of the real numbers R (see line 2 of FIG. 5).

Note that an interval is a point or degenerate interval if X=[x, x]. Also note that the left endpoint of an interior interval is always less than or equal to the right endpoint. The set of extended real numbers, R* is the set of real numbers, R, extended with the two ideal points negative infinity and positive infinity:

$$R^* = R \cup \{-\infty\} \cup \{+\infty\}.$$

In the equations that appear in FIG. 5, the up arrows and down arrows indicate the direction of rounding in the next and subsequent operations. Directed rounding (up or down) is applied if the result of a floating-point operation is not machine-representable.

The addition operation X+Y adds the left endpoint of X to the left endpoint of Y and rounds down to the nearest floating-point number to produce a resulting left endpoint, and adds the right endpoint of X to the right endpoint of Y and rounds up to the nearest floating-point number to produce a resulting right endpoint.

Similarly, the subtraction operation X−Y subtracts the right endpoint of Y from the left endpoint of X and rounds down to produce a resulting left endpoint, and subtracts the left endpoint of Y from the right endpoint of X and rounds up to produce a resulting right endpoint.

The multiplication operation selects the minimum value of four different terms (rounded down) to produce the resulting left endpoint. These terms are: the left endpoint of X multiplied by the left endpoint of Y; the left endpoint of X multiplied by the right endpoint of Y; the right endpoint of X multiplied by the left endpoint of Y; and the right endpoint of X multiplied by the right endpoint of Y. This multiplication operation additionally selects the maximum of the same four terms (rounded up) to produce the resulting right endpoint.

Similarly, the division operation selects the minimum of four different terms (rounded down) to produce the resulting left endpoint. These terms are: the left endpoint of X divided by the left endpoint of Y; the left endpoint of X divided by the right endpoint of Y; the right endpoint of X divided by the left endpoint of Y; and the right endpoint of X divided by the right endpoint of Y. This division operation additionally selects the maximum of the same four terms (rounded up) to produce the resulting right endpoint. For the special case where the interval Y includes zero, X/Y is an exterior interval that is nevertheless contained in the interval R*.

Note that the result of any of these interval operations is the empty interval if either of the intervals, X or Y, are the empty interval. Also note, that in one embodiment of the present invention, extended interval operations never cause undefined outcomes, which are referred to as "exceptions" in the IEEE 754 standard.

Process of Compiling an Interval Subtraction Operation

Figure 6:
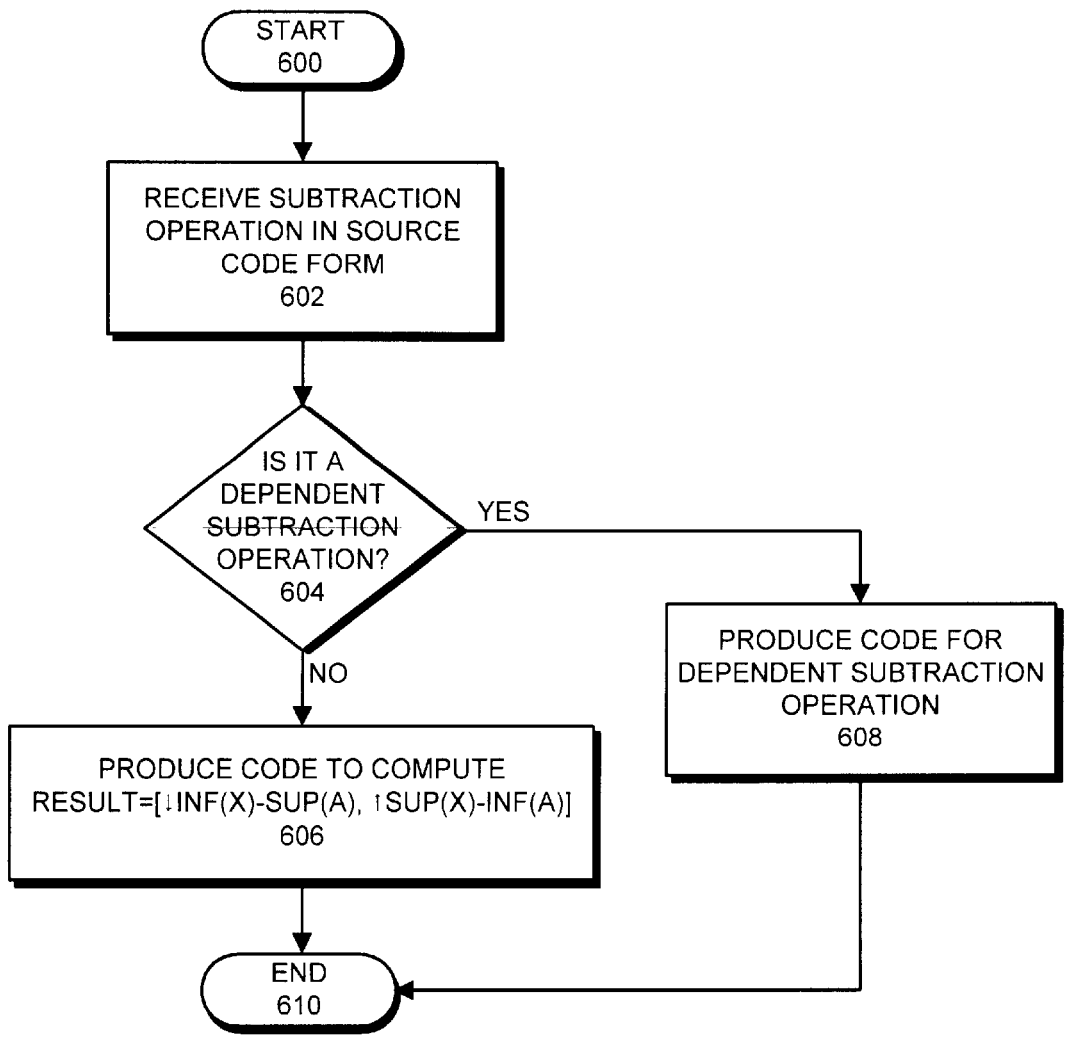
FIG. 6 illustrates the process of compiling an interval subtraction operation in accordance with an embodiment of the present invention.

FIG. 6 illustrates the process of compiling an interval subtraction operation in accordance with an embodiment of the present invention. The process starts by receiving an interval subtraction operation in source code form, such as R=X−A (step 602). The system next determines if the interval subtraction operation is a dependent interval subtraction operation (step 604). This can include looking to see if X is computed from the interval addition operation: X=A+B. The system also responds to an explicit dependent subtraction operation, the syntax for which in FORTRAN is: X.DSUB.A.

If the interval subtraction operation is not a dependent interval subtraction operation, the system computes the result as usual (step 606).

Result=[↓(inf(x)-sup(a)), ↑(sup(x)-inf(a))]

Otherwise, the system performs a dependent subtraction operation as is discussed in more detail below with reference to FIG. 7 (step 608).

At this point the compiled source code is ready to execute. Note that the above-described compilation process can either take place before program execution, or alternatively, during program execution if the compiler is a just-in-time compiler.

Process of Executing a Dependent Interval Subtraction Operation

Figure 7:
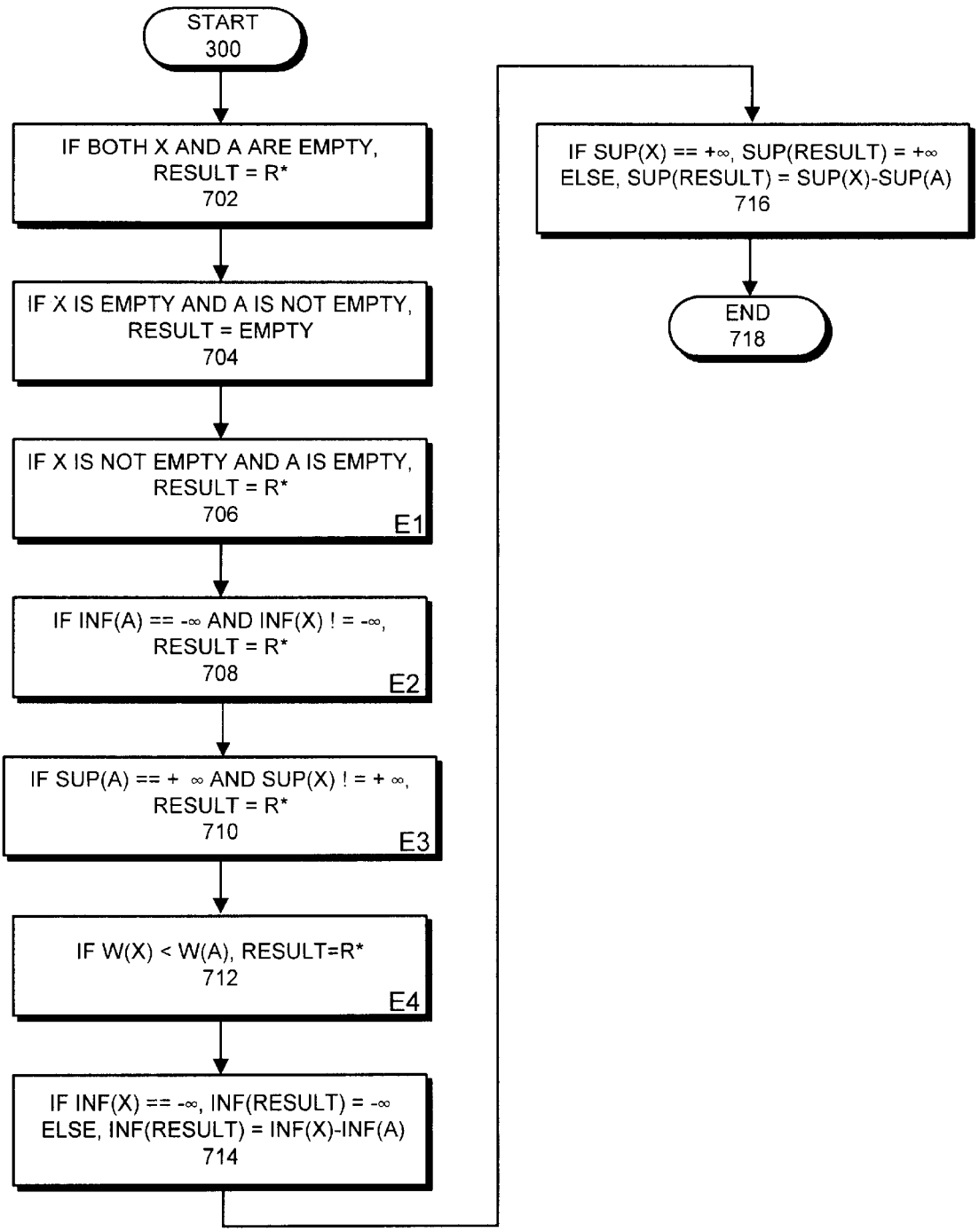
FIG. 7 illustrates the process of executing a dependent interval subtraction operation in accordance with an embodiment of the present invention.

FIG. 7 illustrates the process of executing a dependent interval subtraction operation in accordance with an embodiment of the present invention. FIG. 7 illustrates in more detail the process that appears in step 608 of FIG. 6.

In executing the dependent interval subtraction operation "X.DSUB.A" given X=A+B, the system first determines whether X and A are both empty. If so, then X.DSUB.A is R* (step 702). This is done because since X=A+B, if A is empty, B can be anything (R*) and X must be empty.

Next, the system determines whether X is empty and A is not empty. If so, then X.DSUB.A is empty (step 704). This is done because if X is empty and A is not empty, in order for X=A+B to be true, B must be empty.

Next, the system determines whether X is not empty and A is empty. If so, and then X.DSUB.A is R* (step 706). This is done because since X=A+B, it is impossible for A or B to be empty and for X not to be empty.

Next, the system performs another validity test to determine if inf(A)=−∞ and inf(X)!=−∞. If so, X.DSUB.A is set to R* (step 708). This is done because X=A+B implies that if either inf(A) or inf(B) is −∞, then inf(X) must also be −∞.

Next, the system performs a second validity test to determine if sup(A)=+∞ and sup(X)!=+∞ (note that "!=" denotes not equal). If so, X.DSUB.A is set to R* (step 710). This is done because X=A+B implies that if either sup(A) or sup(B) is +∞, then sup(X) must also be +∞.

The above results for steps 708 and 710 rely on the fact that the values [−∞,−∞] and [+∞,+∞] are not implemented in one embodiment of the present invention. Otherwise, the case in which X=[−∞,+∞] because A=[−∞,−∞] and B=[+∞,+∞] must be considered.

Next, the system performs a third validity test to determine if the width of the interval X, W(X), is less than the width of the interval A, W(A). If so, the input intervals are invalid, and the result is set to R* (step 712). Note that since X=A+B, W(X) must be ≥W(A)+W(B). Hence, W(X) must be ≥W(A).

Next, the system determines whether inf(X)=−∞. If so, and then inf(X.DSUB.A)=−∞, else ↓inf(X)-inf(A) (step 714). This is done because if either inf(A) or inf(B) equals −∞, then inf(X) also equals −∞, unless one of A or B is empty, in which case X is also empty.

Next, the system determines whether sup(X)=+∞. If so, then sup(X.DSUB.A)=+∞, else ↑sup(A)-sup(A) (step 716). This is done because if either sup(A) or sup(B) equals +∞, then sup(X) also equals +∞, unless one of A or B is empty, in which case X is also empty.

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for subtracting a first interval from a third interval to produce a resulting interval given knowledge that the third interval is the sum of the first interval and a second interval, comprising:

computing a left endpoint of the resulting interval;

wherein if the left endpoint of the third interval is negative infinity, the left endpoint of the resulting interval is assigned to be negative infinity, otherwise, the left endpoint of the resulting interval is computed by subtracting a left endpoint of the first interval from a left endpoint of the third interval using a floating-point arithmetic unit, and rounding down to a nearest smaller floating-point number; and computing a right endpoint of the resulting interval;

wherein if the right endpoint of the third interval is positive infinity, the right endpoint of the resulting interval is assigned to be positive infinity, otherwise, the right endpoint of the resulting interval is computed by subtracting a right endpoint of the first interval from a right endpoint of the third interval using the floating-point arithmetic unit, and rounding up to a nearest larger floating-point number;

whereby producing the resulting interval does not cause an exception condition when handling infinite or empty intervals.

2. The method of claim 1, wherein if both the first interval and the third interval are empty:

computing the left endpoint of the resulting interval involves assigning the left endpoint of the resulting interval to be negative infinity; and computing the right endpoint of the resulting interval involves assigning the right endpoint of the resulting interval to be positive infinity.

3. The method of claim 1, wherein if the first interval is not empty and the third interval is empty, the resulting interval is set to be empty.

4. The method of claim 1, wherein if the first interval is empty and the third interval is not empty, a first exception case occurs, in which:

computing the left endpoint of the resulting interval involves assigning the left endpoint of the resulting interval to be negative infinity; and computing the right endpoint of the resulting interval involves assigning the right endpoint of the resulting interval to be positive infinity.

5. The method of claim 1, wherein if the left endpoint of the first interval is negative infinity and the left endpoint of the third interval is not negative infinity, a second exception case occurs, in which:

computing the left endpoint of the resulting interval involves assigning the left endpoint of the resulting interval to be negative infinity; and computing the right endpoint of the resulting interval involves assigning the right endpoint of the resulting interval to be positive infinity.

6. The method of claim 1, wherein if the right endpoint of the first interval is positive infinity and the right endpoint of the third interval is not positive infinity, a third exception case occurs, in which:

computing the left endpoint of the resulting interval involves assigning the left endpoint of the resulting interval to be negative infinity; and computing the right endpoint of the resulting interval involves assigning the right endpoint of the resulting interval to be positive infinity.

7. The method of claim 1, wherein if a width of the third interval is less than a width of the first interval, a fourth exception case occurs, in which:

computing the left endpoint of the resulting interval involves assigning the left endpoint of the resulting interval to be negative infinity; and computing the right endpoint of the resulting interval involves assigning the right endpoint of the resulting interval to be positive infinity.

8. A computer-readable storage medium storing instructions that when executed by a computer cause the computer to perform a method for subtracting a first interval from a third interval to produce a resulting interval given knowledge that the third interval is the sum of the first interval and a second interval, the method comprising:

computing a left endpoint of the resulting interval;

wherein if the left endpoint of the third interval is negative infinity, the left endpoint of the resulting interval is assigned to be negative infinity, otherwise, the left endpoint of the resulting interval is computed by subtracting a left endpoint of the first interval from a left endpoint of the third interval using a floating-point arithmetic unit, and rounding down to a nearest smaller floating-point number; and computing a right endpoint of the resulting interval;

wherein if the right endpoint of the third interval is positive infinity, the right endpoint of the resulting interval is assigned to be positive infinity, otherwise, the right endpoint of the resulting interval is computed by subtracting a right endpoint of the first interval from a right endpoint of the third interval using the floating-point arithmetic unit, and rounding up to a nearest larger floating-point number;

whereby producing the resulting interval does not cause an exception condition when handling, infinite or empty intervals.

9. The computer-readable storage medium of claim 8, wherein if both the first interval and the third interval are empty:

computing the left endpoint of the resulting interval involves assigning the left endpoint of the resulting interval to be negative infinity; and computing the right endpoint of the resulting interval involves assigning the right endpoint of the resulting interval to be positive infinity.

10. The computer-readable storage medium of claim 8, wherein if the first interval is not empty and the third interval is empty, the resulting interval is set to be empty.

11. The computer-readable storage medium of claim 8, wherein if the first interval is empty and the third interval is not empty, a first exception case occurs, in which:

computing the left endpoint of the resulting interval involves assigning the left endpoint of the resulting interval to be negative infinity; and computing the right endpoint of the resulting interval involves assigning the right endpoint of the resulting interval to be positive infinity.

12. The computer-readable storage medium of claim 8, wherein if the left endpoint of the first interval is negative infinity and the left endpoint of the third interval is not negative infinity, a second exception case occurs, in which:

computing the left endpoint of the resulting interval involves assigning the left endpoint of the resulting interval to be negative infinity; and computing the right endpoint of the resulting interval involves assigning the right endpoint of the resulting interval to be positive infinity.

13. The computer-readable storage medium of claim 8, wherein if the right endpoint of the first interval is positive infinity and the right endpoint of the third interval is not positive infinity, a third exception case occurs, in which:

computing the left endpoint of the resulting interval involves assigning the left endpoint of the resulting interval to be negative infinity; and computing the right endpoint of the resulting interval involves assigning the right endpoint of the resulting interval to be positive infinity.

14. The computer-readable storage medium of claim 8, wherein if a width of the third interval is less than a width of the first interval, a fourth exception case occurs, in which:

computing the left endpoint of the resulting interval involves assigning the left endpoint of the resulting interval to be negative infinity; and computing the right endpoint of the resulting interval involves assigning the right endpoint of the resulting interval to be positive infinity.

15. An apparatus that subtracts a first interval from a third interval to produce a resulting interval given knowledge that the third interval is the sum of the first interval and a second interval, the apparatus comprising:

a computing mechanism that is configured to compute a left endpoint of the resulting interval and a right endpoint of the resulting interval;

wherein if the left endpoint of the third interval is negative infinity, the computing mechanism is configured to assign the left endpoint of the resulting interval to be negative infinity, otherwise, the computing mechanism is configured to compute the left endpoint of the resulting interval by subtracting a left endpoint of the first interval from a left endpoint of the third interval using a floating-point arithmetic unit, and rounding down to a nearest smaller floating-point number; and wherein if the right endpoint of the third interval is positive infinity, the computing mechanism is configured to assign the right endpoint of the resulting interval to be positive infinity, otherwise, the computing mechanism is configured to compute the right endpoint of the resulting interval by subtracting a right endpoint of the first interval from a right endpoint of the third interval using the floating-point arithmetic unit, and rounding up to a nearest larger floating-point number;

whereby producing the resulting interval does not cause an exception condition when handling infinite or empty intervals.

16. The apparatus of claim 15, wherein if both the first interval and the third interval are empty:

in computing the left endpoint of the resulting interval, the computing mechanism is configured to assign the left endpoint of the resulting interval to be negative infinity; and in computing the right endpoint of the resulting interval, the computing mechanism is configured to assign the right endpoint of the resulting interval to be positive infinity.

17. The apparatus of claim 15, wherein if the first interval is not empty and the third interval is empty, the computing mechanism is configured to set resulting interval to be empty.

18. The apparatus of claim 15, wherein if the first interval is empty and the third interval is not empty, a first exception case occurs, in which:

in computing the left endpoint of the resulting interval, the computing mechanism is configured to assign the left endpoint of the resulting interval to be negative infinity; and in computing the right endpoint of the resulting interval, the computing mechanism is configured to assign the right endpoint of the resulting interval to be positive infinity.

19. The apparatus of claim 15, wherein if the left endpoint of the first interval is negative infinity and the left endpoint of the third interval is not negative infinity, a second exception case occurs, in which:

in computing the left endpoint of the resulting interval, the computing mechanism is configured to assign the left endpoint of the resulting interval to be negative infinity; and in computing the right endpoint of the resulting interval, the computing mechanism is configured to assign the right endpoint of the resulting interval to be positive infinity.

20. The apparatus of claim 15, wherein if the right endpoint of the first interval is positive infinity and the right endpoint of the third interval is not positive infinity, a third exception case occurs, in which:

in computing the left endpoint of the resulting interval, the computing mechanism is configured to assign the left endpoint of the resulting interval to be negative infinity; and in computing the right endpoint of the resulting interval, the computing mechanism is configured to assign the right endpoint of the resulting interval to be positive infinity.

21. The apparatus of claim 15, wherein if a width of the third interval is less than a width of the first interval, a fourth exception case occurs, in which:

in computing the left endpoint of the resulting interval, the computing mechanism is configured to assign the left endpoint of the resulting interval to be negative infinity; and in computing the right endpoint of the resulting interval, the computing mechanism is configured to assign the right endpoint of the resulting interval to be positive infinity.

\* \* \* \* \*